United States Patent
White

(10) Patent No.: US 8,224,303 B2
(45) Date of Patent: Jul. 17, 2012

(54) METHOD, DEVICE AND SYSTEM FOR SESSION MOBILITY OF MULTIMEDIA CONTENT DELIVERED TO MOBILE COMMUNICATION DEVICES

(75) Inventor: Richard E White, Cary, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 909 days.

(21) Appl. No.: 12/127,273

(22) Filed: May 27, 2008

(65) Prior Publication Data

US 2009/0298484 A1    Dec. 3, 2009

(51) Int. Cl.
*G06F 15/16* (2006.01)
(52) U.S. Cl. .................... 455/414.3; 455/414.1
(58) Field of Classification Search ............ 455/414.1, 455/414.3; 370/254, 263
See application file for complete search history.

(56) References Cited

U.S. PATENT DOCUMENTS

2006/0173888 A1 * 8/2006 Narahara et al. ............ 707/102
2009/0011792 A1 * 1/2009 van Rooyen ............ 455/552.1

* cited by examiner

*Primary Examiner* — Sam Bhattacharya

(57) ABSTRACT

A method, device and system for providing communication session mobility of multimedia content delivered to a mobile communication device, such as a Digital Video Broadcasting-Handheld (DVB-H) mobile video device. For example, multimedia content delivered to a mobile communication device via a DVB-H network can be transferred seamlessly to a cellular data network. Session mobility is provided using a control server or session controller configured to manage and facilitate the transfer of the content delivery. The control server manages the transfer in response to receiving appropriate communication session control information from the mobile communication device. The control server can be a network element coupled to or contained within the network that couples a multimedia content source to one or more wireless control points that communicate with the end user mobile communication device. Alternatively, the control server can be partially or completely included or contained within the multimedia content provider.

19 Claims, 8 Drawing Sheets

METHOD, DEVICE AND SYSTEM FOR SESSION MOBILITY OF MULTIMEDIA CONTENT DELIVERED TO MOBILE COMMUNICATION DEVICES

BACKGROUND OF THE INVENTION

1. Field of the Invention

The invention relates to providing multimedia content and other digital information to end user mobile communication devices. More particularly, the invention relates to providing session mobility of multimedia content delivered to end user mobile communication devices, such as Digital Video Broadcasting-Handheld (DVB-H) mobile communication devices.

2. Description of the Related Art

End user handheld or mobile communication devices, such as Digital Video Broadcasting-Handheld (DVB-H) mobile video devices, currently are capable of receiving various multimedia content, including video broadcasts from suitable content sources, such as over-the-air broadcasters, from a cable television plant, satellite service providers or other multimedia service providers. Also, the ability to transfer communication sessions between communication devices generally has been discussed in various standards organizations, such as the International Telecommunications Union (ITU), the Alliance for Telecommunications Industry Solutions (ATIS), and the Telecoms and Internet converged Services and Protocols for Advanced Networks (TISPAN), which is a standardization body of the European Telecommunications Standards Institute (ETSI).

However, mobile communication devices, including DVB-H mobile video devices, currently do not support session mobility of multimedia content delivered to mobile communication devices across different wireless networks, such as from content delivery via a DVB-H network to content delivery via a cellular data network. Therefore, for example, if a mobile communication device receiving multimedia content via a DVB-H network leaves the coverage area of the DVB-H network, the mobile communication device currently is unable to continue receiving multimedia content until the mobile communication device returns to the DVB-H network coverage area.

DETAILED DESCRIPTION

Figure 1:
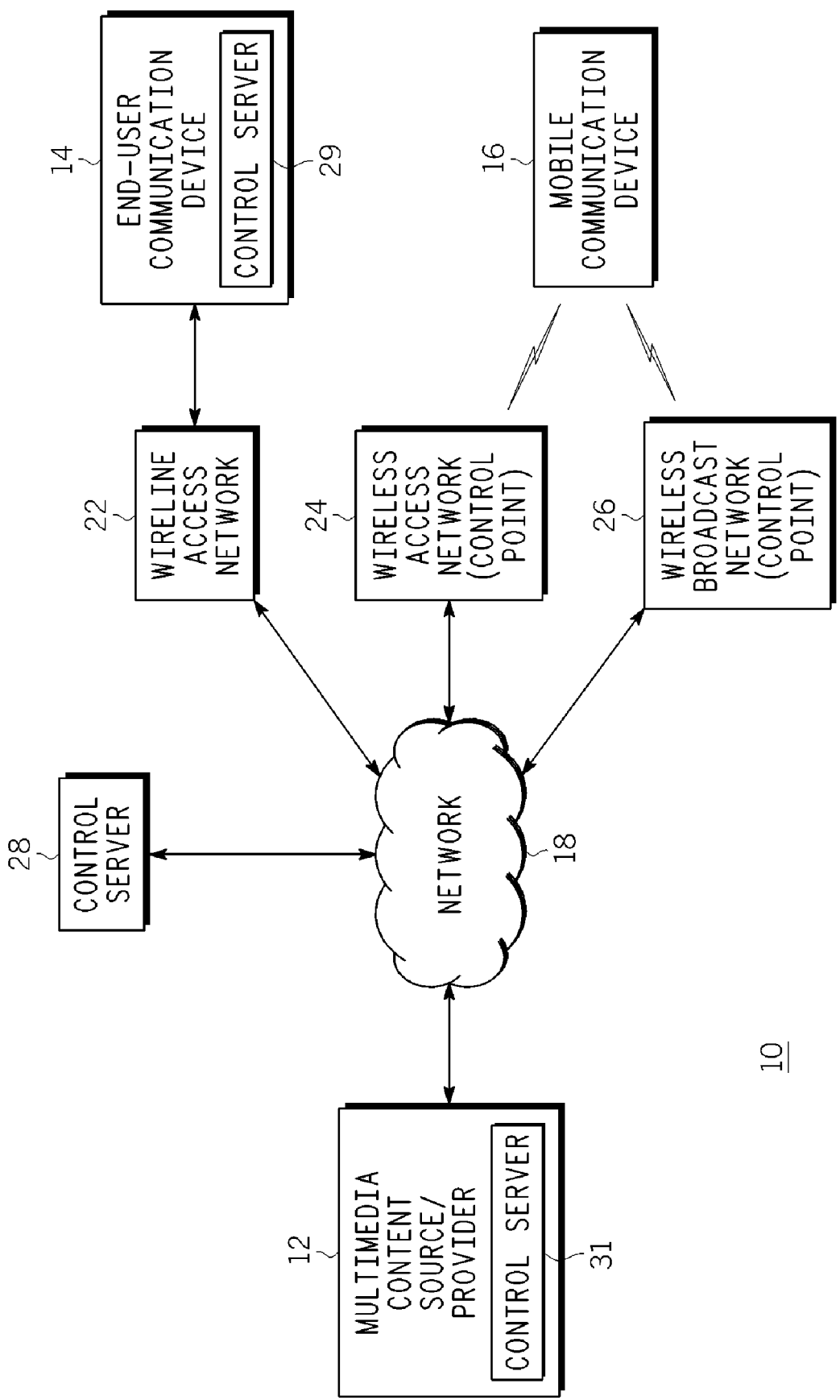
FIG. 1 is a block diagram of a communication system used for providing session mobility of multimedia content delivered to a mobile communication device, such as a Digital Video Broadcasting-Handheld (DVB-H) mobile video device.

In the following description, like reference numerals indicate like components to enhance the understanding of the session mobility systems, devices and methods through the description of the drawings. Also, although specific features, configurations and arrangements are discussed herein below, it should be understood that such specificity is for illustrative purposes only. A person skilled in the relevant art will recognize that other steps, configurations and arrangements are useful without departing from the spirit and scope of the invention.

The methods, devices and systems described herein involve providing communication session mobility to a mobile communication device, such as a Digital Video Broadcasting-Handheld (DVB-H) mobile video device. For example, a communication session delivering multimedia content to a mobile communication device via a broadcast (DVB-H) network can be transferred seamlessly between the DVB-H network and another appropriate network, such as a wireless access (cellular data) network. Also, for example, multimedia content delivered to and/or stored on a set-top box or other end user communication device at the home of an end user can be transferred seamlessly to the end user's mobile communication device using an appropriate wireless access network, such as a wireless broadcast DVB-H network and/or a wireless access (cellular data) network. The session mobility is provided using a control server or session controller that is configured to manage and facilitate the transfer of the multimedia content delivered to the mobile communication device. The control server is configured to transfer multimedia content to the mobile communication device in response to receiving a transfer request or other appropriate communication session control information from the mobile communication device as needed to control and manage the transfer of the communication session. The control server also is configured to discontinue or terminate an existing transfer of multimedia content to the mobile communication device in response to receiving appropriate communication session control information. The control server can be a network element coupled to and/or contained within the network or networks that couple a multimedia content source to one or more wireless control points that communicate with the mobile communication device. Alternatively, the control server can be partially or completely included or contained within the multimedia content provider or other network elements.

Referring to FIG. 1, shown is a block diagram of a communication system 10 for use in providing session mobility of multimedia content delivered to a mobile communication device, such as a Digital Video Broadcasting-Handheld (DVB-H) mobile video device. The system 10 includes a multimedia content source or provider 12, a mobile communication device 16 (e.g., a DVB-H mobile video device). The system 20 also can include an end user communication device 14, such as a set-top box or other end user processing device. The mobile communication device 16 is coupled to the multimedia content source 12 via one or more networks 18, which can include or be coupled to one or more wireless access networks or network control points 24 (e.g., a cellular data network) and/or one or more wireless broadcast networks or network control points 26 (e.g., a DVB-H network). The end user communication device 14 can be coupled to the multimedia content source 12 via one or more networks 18, which can include a wireline access network 22. The system 10 also includes a control server or session controller 28, which can be a network element coupled to and/or contained within the network 18 or, alternatively, can be part of the end user communication device 14 (shown generally as control server 29) and/or other suitable device, component or network in the system 10, including the multimedia content provider 12 (shown generally as control server 31).

The multimedia content source 12 can be any suitable transmission source of multimedia content, such as from a cable television plant, satellite service provider or other multimedia service provider. The multimedia content can be any suitable multimedia content, including Internet Protocol Television (IPTV) video content, which is considered to be any video or content delivered over the internet using IP protocols. Also, the multimedia content can include movies, programming events, music, photos and/or other multimedia content that is distributed, e.g., as one or more programming streams from a broadcast source or other suitable multimedia content source. The multimedia content typically is a plurality of digital signals formatted according to a suitable standard, such as the MPEG (Moving Picture Experts Group) 2 or MPEG 4 standard, and multiplexed into a data stream that is modulated on a carrier using quadrature amplitude modulation (QAM) or other suitable modulation technique.

The multimedia content source 12 can include or be coupled to an IPTV broadcast video server (not shown), which is the portion of an IPTV distribution system that distributes IPTV "channels" to the end users, e.g., using multicast IP protocols. The IPTV distribution system includes a headend (e.g., video acquisition system and encoders), content management and digital rights management (DRM), and IP fiber backbone & edge routers. The IPTV distribution system also includes a set of protocols used for content delivery to the end user. These protocols can be open, standard, proprietary, or a combination. Typically, this system is closed and available only to subscribers.

The multimedia content source 12 also can be coupled to an Internet video source (not shown), which generally is any suitable source that provides Internet video and/or other IPTV content to the end users. IPTV content can range from download to streaming content. Any server on the Internet can supply the video content. Most Internet video systems are open and available to anyone with an Internet connection, although some Internet video systems may require membership or user login.

The multicast streams delivered from an IPTV broadcast video server to the end user communication device 14 may be different than the multicast streams delivered from an IPTV broadcast video server to the mobile communication device 16. The use of different multicast streams allows the IPTV broadcast video server to provide "mobile-friendly" streams to the mobile communication device 16, i.e., multicast streams that are better able to be received and processed by the mobile communication device 16 than multicast streams formatted for set-top boxes and other end user communication devices 14.

One or more of the network 18, the wireline access network 22, the wireless access network or network control point 24 and/or the wireless broadcast network or network control point 26 can be any communication network or network server arrangement suitable for coupling directly or indirectly to the multimedia content source 12, the end user communication device 14, the mobile communication device 16 and/or the control server 28. For example, all or a portion of the network 18, the wireline access network 22, the wireless access network or network control point 24 and/or the wireless broadcast network or network control point 26 can be the Internet or an Internet protocol (IP) based network, a computer network, a web-based network or other suitable wired or wireless network system. Also, at least a portion of the network 18, the wireline access network 22, the wireless access network or network control point 24 and/or the wireless broadcast network or network control point 26 can be any wired or wireless wide area network (WAN), local area network (LAN) or wireless local area network (WLAN), such as a residential network.

One or more of the multimedia content source 12, the end user communication device 14, the mobile communication device 16 and/or the control server 28 can be coupled to one or more of the network 18, the wireline access network 22, the wireless access network or network control point 24 and/or the wireless broadcast network or network control point 26 via any suitable connection or connections, e.g., one or more coaxial cables and/or optical fibers, including a Hybrid Fiber Coaxial (HFC) cable system. Other suitable connections include suitable Fiber To The Premises (FTTP) systems, such as Fiber To The Curb (FTTC) or Fiber To The Home (FTTH), or over any suitable number of digital subscriber line systems (xDSL). Also, the multimedia content can be provided wirelessly, e.g., via over-the-air-broadcast from a satellite service provider or other suitable content service provider. One or more of the end user communication device 14, the mobile communication device 16 and/or the control server 28 can be configured to receive multimedia content from the multimedia content source 12 via a computer network, either through a wired connection or wirelessly. Alternatively, one or more of the end user communication device 14, the mobile communication device 16 and/or the control server 28 can be configured to receive multimedia from the multimedia content source 12 wirelessly, via a wireless network.

The end user communication device 14 can be any suitable multimedia content processing device. The end user communication device 14 can be partially or completely any suitable device or subsystem (or portion thereof) for receiving multimedia content from the multimedia content source 12, storing the received multimedia content (for later viewing), processing and/or decoding the received multimedia content, and transmitting or transferring the processed multimedia content to an end user display device (not shown). For IPTV content and other multimedia content, the end user communication device 14 receives the content and decodes the content in real-time for viewing on the display device. The display device can be a separate component from the end user communication device 14, such as a television, a computer monitor or other suitable display device. Alternatively, the end user communication device 14 and the display device can be combined or integrated as a single component.

For example, the end user communication device 14 can be any digital video recorder (DVR) or digital video server (DVS) device, including any signal converter or decoder (set-top) box with internal and/or external recording capabilities and local and/or remote storage, which often are referred to as personal video recorder (PVR) devices. Other suitable end user communication devices include a residential gateway, a home media server system, a digital video disk recorder, a computer, a television with built-in or added-on multimedia content receiving and/or storing capability, and/or other suitable computing devices or multimedia content devices, including internet protocol (IP), satellite and cable digital video recorders, and home area network (HAN) devices and systems.

The wireline access network 22 can be any suitable device and/or network component or components for routing multimedia content, including IPTV content, between the end user communication device 14 and the network 18. All or a portion of the wireline access network 22 can be part of a residential gateway or a home media server system that includes the end user communication device 14. Alternatively, all or a portion of the wireline access network 22 and/or its functionality can be incorporated into or contained within the end user communication device 14. The wireless access network 24 can be any suitable cellular data unicast network that delivers content, e.g., using an IP unicast protocol. The wireless broadcast network 26 can be any suitable broadcast network, e.g., a DVB-H broadcast network.

The mobile communication device 16 can be any suitable mobile end user communication device that is configured to receive multimedia content from the multimedia content source 12 and/or the control server 28 (as will be discussed in greater detail hereinbelow) via the network 18 and one or more of the wireless access network or network control point 24 and the wireless broadcast network or network control point 26. Also, the mobile communication or video device 16 can be any suitable device that has connectivity to a wireless wide area broadband data network, such as via WiMAX (Worldwide Interoperability for Microwave Access), Ev-Do (Evolution-Data Optimized), or HSxPA (High Speed Packet Access). The mobile video device 22 is capable of receiving IPTV content in the form of data packets via the wireless data network and decoding and displaying the data packets on a built-in display. The mobile video device 22 also is capable of accessing an Electronic Program Guide (EPG) for determining available IPTV content. The selection of IPTV content is similar to that of the set-top box 18.

For example, the mobile communication device 16 can be a DVB-H mobile video device, including a DVB-H handset. Alternatively, the mobile communication device 16 can be any other suitable mobile or cellular telephone, a smartphone, a personal digital assistant (PDA) device or other wireless handheld device with such capability, a digital camera with such capability, a laptop personal computer (PC) or a notebook PC. The mobile communication device 16 typically is connected to the network 18 via the wireless access network 24 and/or the wireless broadcast network 26. As will be discussed in greater detail hereinbelow, the mobile communication device 16 also can interact with the end user communication device 14 via the control server 28.

The control server or session controller element 28 is a network element and/or device component that includes a collection of the functionality used for supporting the delivery, and the manner of delivery, of multimedia content (including IPTV content) to the mobile communication device 16 over various wireline and/or wireless access networks. Such delivery can be part of a communication session transfer between multimedia content delivered to the mobile communication device 16 via the wireless broadcast network 26 and multimedia content delivered to the mobile communication device 16 via the wireless access (cellular data) network 24. As part of this functionality, the control server 28 is configured to receive, store and process multicast streams of multimedia content from the multimedia content server 12, for delivery to the mobile communication device 16 via the wireless broadcast network 26 and via the wireless access network 24. Also, as will be discussed in greater detail hereinbelow, the control server 28 also facilitates the interaction between delivery of multimedia content from the end user communication device 14 to the mobile communication device 16 via the wireless broadcast network 26 and via the wireless access network 24. By controlling the manner in which content is delivered to the mobile communication device 16, e.g., over one or more of the various available wireless access networks and control points, the control server 28 improves content delivery to the mobile communication device 16 amid various content delivery issues, such as wireless bandwidth availability and capacity.

The control server 28 can be partially or completely any suitable network element, device or subsystem (or portion thereof) configured for receiving multimedia content (including IPTV content) from the multimedia content source 12, storing the received multimedia content, processing or decoding the received multimedia content, and transmitting or transferring the processed multimedia content to the mobile communication device 16, e.g., via the network 18 and one or more of the wireless access network or network control point 24 and/or the wireless broadcast network or network control point 26. Also, the control server 28 can be partially or completely any suitable network element, device or subsystem (or portion thereof) configured for receiving communication session control information from the mobile communication device 16 or one or more other appropriate system or network components. As will be discussed in greater detail hereinbelow, communication session control information generally includes information that the control server uses to manage, control and facilitate the transfer of the delivery of multimedia content to the mobile communication device 16 between the wireless broadcast network 26 and the wireless access network 24.

As discussed hereinabove, the control server 28 can be a network element or device coupled to and/or contained within one or more of the network 18, the wireline access network 22, the wireless access network or network control point 24 and/or the wireless broadcast network or network control point 26. Alternatively, the control server 28 can be partially or completely packaged, stored, built or otherwise contained on or within one or more of the end user communication device 14 (shown generally as 29) and/or the multimedia content source 12 (shown generally as 31), and/or one or more of the network 18, the wireline access network 22, the wireless access network or network control point 24 and/or the wireless broadcast network or network control point 26.

Figure 2:
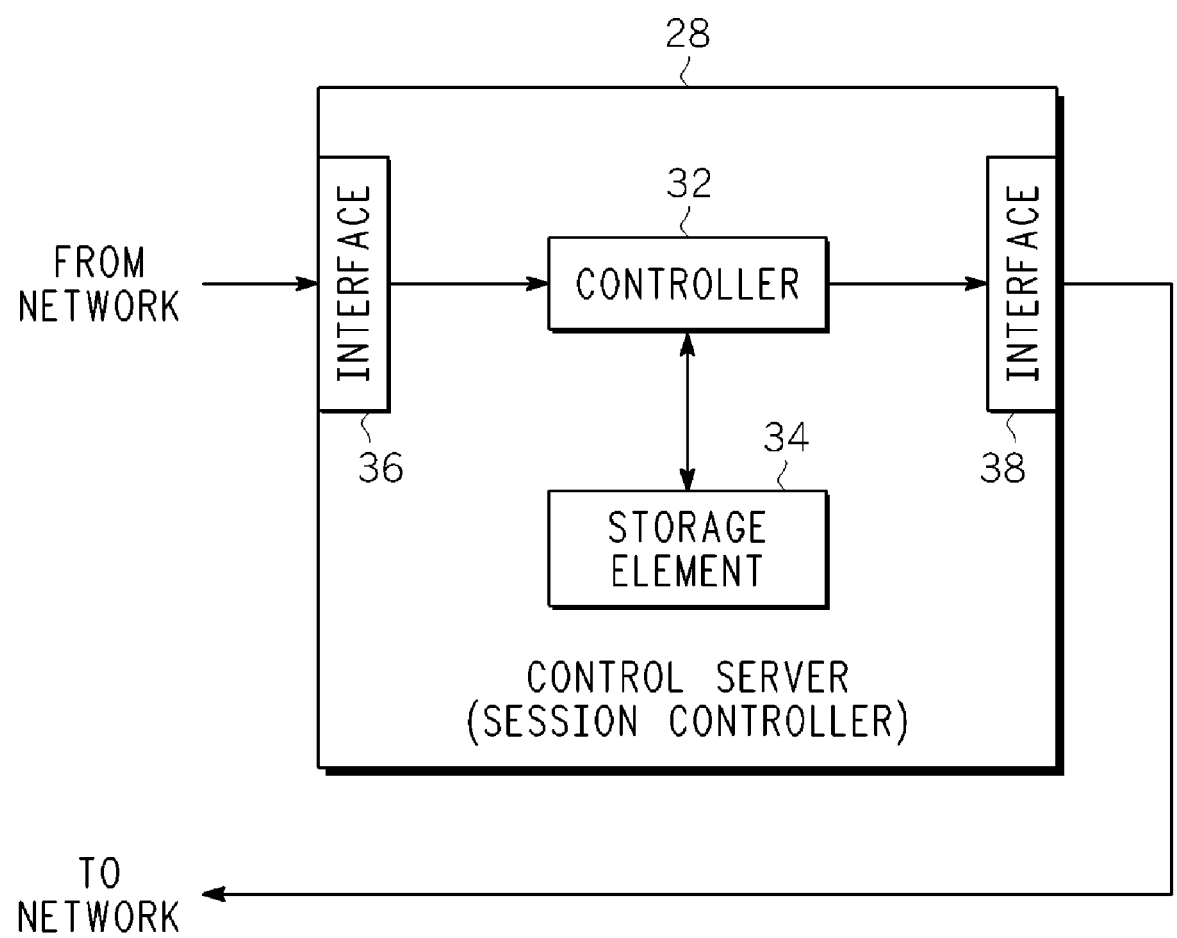
FIG. 2 is a block diagram of a control server or session controller device for providing session mobility of multimedia content delivered to a mobile communication device, such as a DVB-H mobile video device.

Referring now to FIG. 2, with continuing reference to FIG. 1, shown is a block diagram of the control server (session controller) device 28 for providing session mobility of the multimedia content delivered to the mobile communication device 16. The control server 28 includes a controller or processor 32 that, in general, processes multimedia content and other information received by the control server 28, such as communication session control information, as will be discussed in greater detail hereinbelow. The control server 28 also includes a content storage element 34 coupled to the controller 32. In addition to the content storage element 34, the control server 28 can include at least one type of memory or memory unit (not shown) within the controller 32 and/or a storage unit or data storage unit coupled to the controller 32 for storing processing instructions and/or information received and/or created by the control server 28.

The control server 28 also can include one or more input and/or output interfaces 36, 38 for receiving and delivering multimedia content and other information, such as communication session control information, via one or more networks, such as the network 18. For example, the controller 32 and other components in the mobile communication device 16 can be coupled between a first or input interface 36 and a second or output interface 38. The input interface 36 can receive multimedia content, e.g., from the multimedia content source 12 and/or the end user communication device 14, and communication session control information, e.g., from the mobile communication device 16, as well as other information. The input interface 36 can forward received information to the content storage element 34. The output interface 38 can transmit multimedia content received and/or stored by the control server 28 to the mobile communication device 16 and other suitable devices. Also, the output interface 38 can transmit communication session control information to the wireless broadcast network 26, the wireless access network 24 and and/or the mobile communication device 16. It should be understood that one or more of the interfaces 36, 38 can be a single input/output interface coupled to the controller 32. Also, it should be understood that one or more of the interfaces 36, 38 can be an interface configured to support more than one connection from more than one network device.

The input and/or output interfaces 36, 38 are configured to provide any protocol interworking between the other components of the control server 28 and the other components within the system 10. Since all content distribution systems are not the same, the interfaces 36, 38 are configured to support the protocols of the particular system that is providing the content. Such protocol support functionality includes the identification of each of the content streams and corresponding protocol support required by the distribution system. Each distribution system will use a defined set of protocols.

Also, as discussed hereinabove, the input interface 36 also serves to forward received content to the storage element 34. Such forwarding can be on a per user basis or, alternatively, all content streams can be forwarded to the storage element 34 for storage. Such storage determination is made by the controller 32. The controller 32 also controls the retrieval of stored content from the storage element 34, e.g., on a per user basis or, alternatively, on a per stream basis. The "per stream" basis is much like a broadcast stream. In this manner, the storage element 34 can act much like a network DVR.

The controller 32 is the central control point within the control server 28 responsible for the setup, termination and control of content session mobility of multimedia content delivered to the mobile communication device 16 via the wireless broadcast network 26 and the wireless access network 24. The controller 32 also provides the appropriate control and decision-making to support access control, quality of service (QoS) and digital rights management (DRM) of content delivered to the mobile communication device 16 via the wireless broadcast network 26 and the wireless access network 24. The controller 32 is coupled to the storage element 34 and the various interfaces 36, 38. The controller 32 also can be coupled directly to the network 18. The controller 32 communicates with both the mobile communication device 16 and the end user communication device 14 via the appropriate access networks or network control points.

The controller 32 interfaces with the output interface 38 to initiate, terminate and control the transfer of content delivered to the mobile communication device 16 via the wireless broadcast network 26 and the wireless access network 24. For example, the controller 32 interfaces with AAA (Authentication, Authorization, Accounting) servers within or coupled to the network 18 to obtain the appropriate authentication of end users and end user devices, as well as authorization of the end users to access various available content and associated services.

The controller 32 also initiates access with the appropriate wireless access networks 24, 26 for the mobile communication device 16 and negotiates QoS parameters with the access network. The controller 32 is a QoS policy decision point for the control server 28. The controller 32 receives access network flow information and, based on this information, interacts with the various wireless access networks 24, 26 to provide or determine the most efficient data transfer involving the control server 28. The controller 32 serves this function for both content received by the control server 28 (e.g., via the input interface 36), as well as content transferred from the control server 28 (e.g., via the output interface 38) by resolving content delivery requests against QoS policy for a subscriber or group of subscribers and/or access networks.

With respect to DRM, the controller 32 enforces DRM for delivery of content to the appropriate end users and mobile communication devices 16. The controller 32 also provides interworking between different types of DRM, both on the end user communication device side and the network side.

The controller 32 is responsible for the transfer and flow control of content from the storage element 34 to the mobile communication device 16, via the appropriate wireless access network interface 24, 26. The controller 32 performs such functionality based on various communication session control information received and/or provided by the controller 32. Such communication session control information includes information received from the appropriate wireless access networks, such as hints, triggers, handoff information, congestion information and other control information. Such communication session control information also includes information received from the mobile communication device 16 and other network elements, such as transfer requests and other appropriate information.

The controller 32 also is configured to handle real-time flow control with the mobile communication device 16, including QoS enforcement and trick play instructions received by the end user from the mobile communication device 16. The mobile communication device 16 typically has some amount of buffering for video content playback. The controller 32 maintains the mobile communication device buffer as close to maximum as possible, even during drop outs and handovers. Such buffering is done to provide continuous content to the mobile communication device 16 for viewing.

The controller 32 also is responsible for any transcoding that may be required. Such transcoding can be done on an individual basis. The controller 32 also is responsible for formatting the content that is sent to the mobile communication device 16, as necessary. Such formatting can take the form of MPEG compression or direct screen information.

The wireless access network interfaces 24, 26 are responsible for interfacing the control server 28 with the appropriate wireless access network or network control point being supported. The particular wireless access network interface 24, 26 typically will be different for various supported access networks to allow for appropriate interfacing with the various wireless access networks and their respective capabilities. For example, the supported wireless networks can include WiMAX, HSxPA, and Ev-Do. The wireless access network interface 24, 26 interwork the protocols used by the particular wireless access network with the protocols used in the control server 28 to support the functionality supported by the wireless access network. In general, the wireless access network interface 24, 26 routes control information to the controller 32.

The wireless access network interface 24, 26 also supports any wireless access network specific information, such as hints, triggers, handoff information, congestion information, QoS information and other suitable information. Such information is passed to the controller 32. As discussed hereinabove, the controller 32 uses such information to make decisions related to content flow and session control.

The controller 32 also can include a management controller portion (not shown). The management controller portion generally is responsible for the configuration, operation and management of the control server 28. The management controller portion also can collect and provide statistics on the individual components of the control server 28, as well as the overall operation of the control server 28.

One or more of the controller 32, the storage element 34 and the interfaces 36, 38 can be comprised partially or completely of any suitable structure or arrangement, e.g., one or more integrated circuits. Also, it should be understood that the control server 28 includes other components, hardware and software (not shown) that are used for the operation of other features and functions of the control server 28 not specifically described herein.

The control server 28 can be partially or completely configured in the form of hardware circuitry and/or other hardware components within a larger device or group of components. Alternatively, the control server 28 can be partially or completely configured in the form of software, e.g., as processing instructions and/or one or more sets of logic or computer code. In such configuration, the logic or processing instructions typically are stored in a data storage device, e.g., the content storage element 34 or other suitable data storage device (not shown). The data storage device typically is coupled to a processor or controller, e.g., the controller 32. The controller accesses the necessary instructions from the data storage element and executes the instructions or transfers the instructions to the appropriate location within the control server 28.

As discussed hereinabove, mobile communication devices can receive multimedia content, including video content, from a multimedia content source or from an end user communication device 14, such as a set-top box. However, there is no support for session mobility of the multimedia content delivered to mobile communication devices. That is, there is no support for coordinating the delivery of multimedia content from a multimedia content communication session or video session to a mobile communication device via the wireless broadcast network 26 and the wireless access network 24. One issue related to session mobility for the delivery of multimedia content to mobile communication devices, including DVB-H devices, is that DVB-H is a broadcast technology. Conventionally, a DVB-H mobile video device only has access to the current broadcast. Therefore, if an end user is receiving video content to their mobile communication device and leaves the coverage area of the DVB-H network or otherwise begins losing DVB-H coverage, the end user is not able to continue receiving the video content until the end user returns to the coverage area of the DVB-H network. The systems, devices and methods described herein introduce a network element that allows an end user to transfer the delivery of a video session to the mobile communication device between the wireless broadcast network 26, e.g., a DVB-H network, and the wireless access network 24, e.g., a cellular data network 24.

One of the major problems with video content delivery to a mobile communication device is the bandwidth required. The systems, devices and methods described herein provide the ability to deliver video content to an end user mobile communication device at a particular time over one or more wireless access networks, such as a cellular data network. When the end user has completed viewing the video content on the mobile communication device delivered via the wireless access network, e.g., by changing "channels," content delivery can revert (back) to the wireless broadcast network, e.g., the broadcast DVB-H system.

The broadcast of information according to the DVB-H standard, e.g., for receipt by a DVB-H mobile end user communication device, typically occurs on a different frequency and via a different wireless access network than that used for transmission of cellular data and information, e.g., to and from cellular communication devices. However, cellular data and the cellular network voice and data information access network can be used by mobile communication devices, including DVB-H mobile end user communication devices, to control content delivery. Therefore, the control server or session controller 28 can be used to coordinate and facilitate the transfer of the delivery of multimedia content to a mobile communication device, such as a DVB-H mobile video device, between a wireless broadcast network (e.g., a DVB-H network) and a wireless access network (e.g., a cellular data network). In response to receiving appropriate communication session control information, e.g., from the mobile communication device, the control server 28 can receive and buffer or store the same multimedia content being transmitted to the mobile communication device via the same multimedia content source being broadcast by the wireless broadcast network 26 for delivery to the mobile communication device via the wireless access network 24.

The control of content delivery can depend on various factors or considerations, such as the location of the mobile communication device and the availability of one or more wireless access networks at the particular location, bandwidth constraints or requirements for content delivery, e.g., the available bandwidth of the various data paths, including wireless data paths. Such management and control can be in response to communication session control information transmitted to the control server by the particular mobile communication device for which session mobility is to be provided. In this manner, the delivery of multimedia content to a mobile communication device as part of a communication session can be transferred between a wireless broadcast network and a wireless access network. As will be discussed in greater detail hereinbelow, the control server 28 is configured to provide the multimedia content to the mobile communication device 16 in the same form regardless of the wireless network used to deliver the content.

Figure 3:
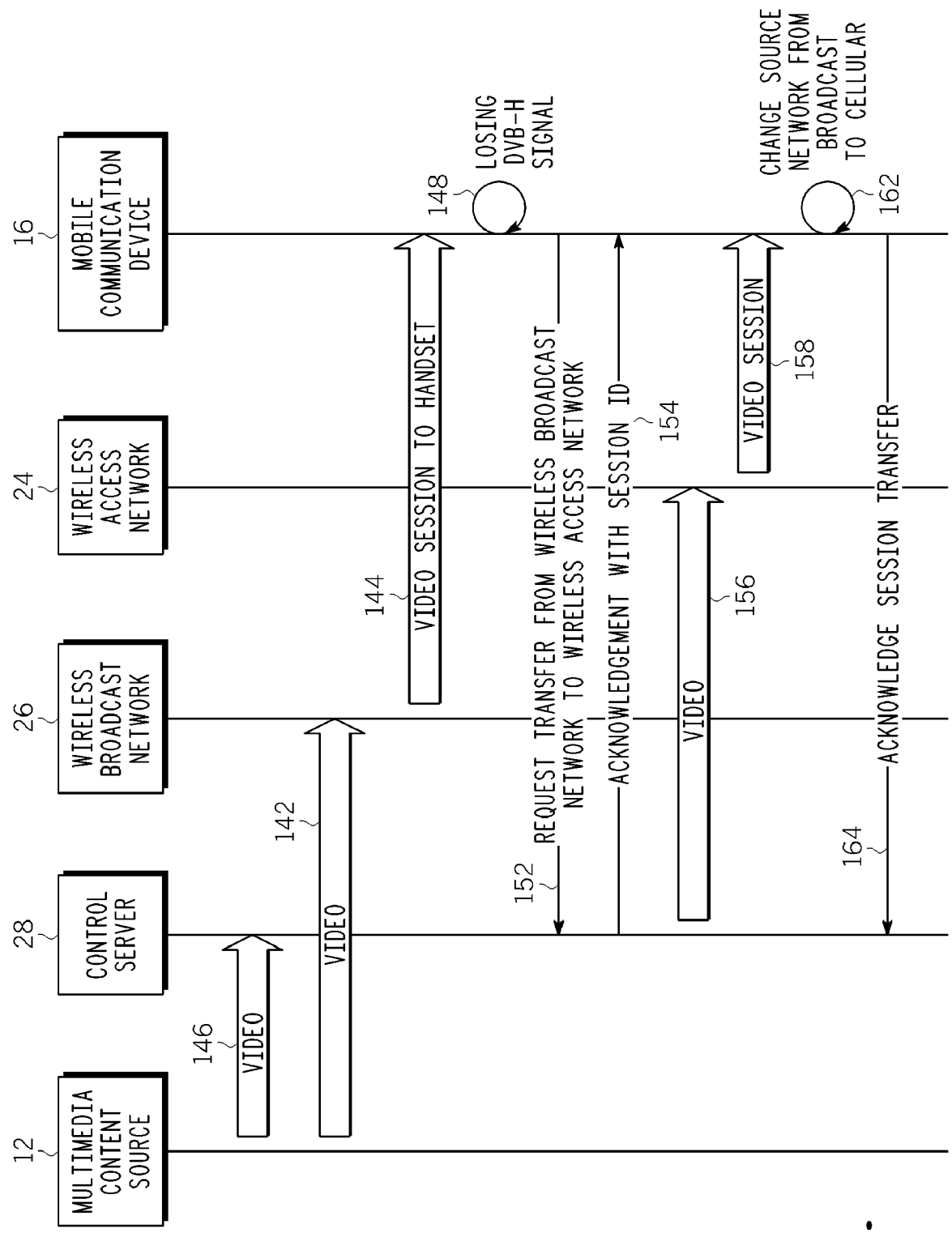
FIG. 3 is a flow diagram of the transfer of multimedia content of a communication session delivered to a mobile communication device, such as a DVB-H mobile video device, via a broadcast (e.g., DVB-H) network to multimedia content of the communication session delivered to the mobile communication device via a wireless access (cellular data) network.

Referring now to FIG. 3, shown is a flow diagram of the transfer of multimedia (video) content of a communication session delivered to a mobile communication device, such as a DVB-H mobile video device, via a wireless broadcast network, such as a DVB-H network, to multimedia content of the communication session delivered to the mobile communication device via a wireless access network, such as a cellular data network. For example, an end user receiving broadcast video content on a DVB-H mobile communication device leaves the broadcast coverage area of the DVB-H network, but would like to continue having video content delivered to the mobile communication device.

In this example, it is assumed that the mobile communication device 16 is connected to the network 18 via the wireless broadcast network 26. As will be shown in the flow diagram, the video session will be delivered to the mobile communication device 16 via the wireless broadcast network 26. It is assumed that the mobile communication device 16 has registered itself to the system 10 and is a known member of a transferable device group.

In this example, video content from the multimedia content source 12 is delivered to the wireless broadcast network 26, e.g., via the network 18. Such delivery is shown generally as a video session 142. The video content received by the wireless broadcast network 26 is broadcast to the mobile communication device 16. Such video content delivery is shown generally as a video session 144. Also, the control server 28 is receiving and buffering the same video content that is being received and broadcast by the wireless broadcast network 26 to the mobile communication device 16. Such video content receipt and storage by the control server 28 is shown generally as a video session 146.

The delivery of video content to the mobile communication device 16 as part of the communication session is to be transferred from the wireless broadcast network 26 to the wireless access network 24. The transfer is originated by the mobile communication device 16, e.g., when the mobile communication device 16 determines that the mobile communication device 16 is losing its signal (shown generally as 148), such as when the mobile communication device 16 is leaving the broadcast coverage area of the wireless broadcast network 26.

The mobile communication device 16 requests a transfer from the control server 28 to the wireless access network 24. Such transfer request, which typically includes transmitting appropriate communication session control information to the control server 28, is shown generally as a transfer request 152. The control server 28 controls or facilitates the transfer. As discussed, the control server 28 is receiving and buffering the same video content (video session 146) that is being broadcast over the wireless broadcast network 26. The control server 28 sends the mobile communication device 16 an acknowledgement 154, which can include a session identification (session ID).

The control server 28 then begins delivering buffered video content to the wireless access network 24. Such delivery is shown generally as a video session 156. The control server 28 also informs the mobile communication device 16 that the control server 28 is delivering buffered video content to the wireless access network 24. The wireless access network 24, in turn, begins delivering the video content to the mobile communication device 16. Such delivery is shown generally as a video session 158.

The mobile communication device 16 begins receiving the video stream via the wireless access network 24. Accordingly, the video source for the video player in the mobile communication device 16 will change from the wireless broadcast (DVB-H) network 26 to the wireless access (cellular data) network 24. Such source change is shown generally as a source change 162. The mobile communication device 16 then sends the control server 28 an acknowledgement 164 of the session transfer of the delivery of content from the wireless broadcast network 26 to the wireless access network 24.

Figure 4:
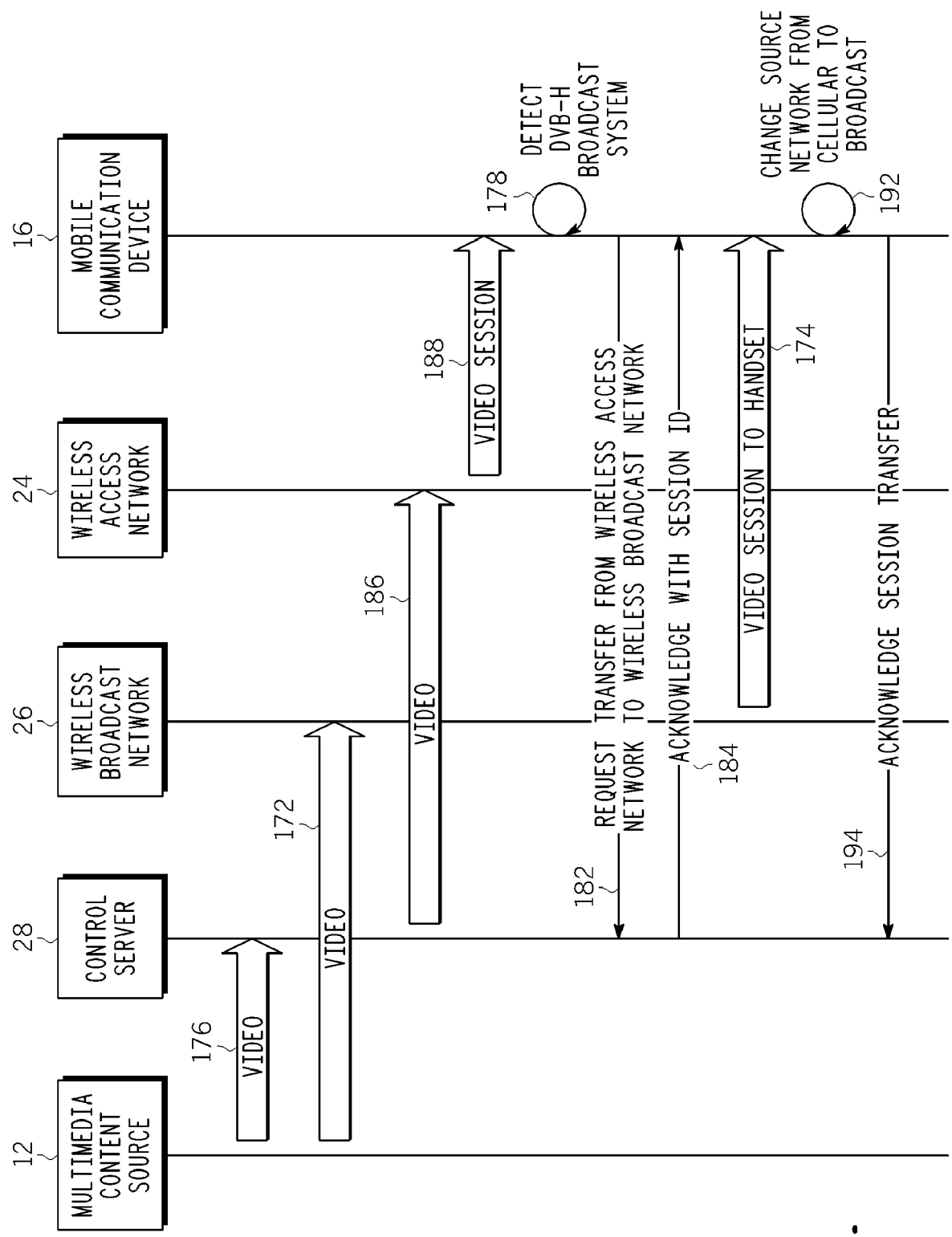
FIG. 4 is a flow diagram of the transfer of multimedia content of a communication session delivered to a mobile communication device, such as a DVB-H mobile video device, via a wireless access (cellular data) network to multimedia content of the communication session delivered to the mobile communication device via a broadcast (e.g., DVB-H) network.

Referring now to FIG. 4, shown is a flow diagram of the transfer of multimedia (video) content of a communication session delivered to a mobile communication device, such as a DVB-H mobile video device, via a wireless access network, such as a cellular data network, to multimedia content of the communication session delivered to the mobile communication device via a wireless broadcast network, such as a DVB-H network. For example, an end user who had previously left the coverage area of a wireless broadcast (DVB-H) network and is receiving multimedia (video) content on a DVB-H mobile communication device via a wireless access (cellular data) network has returned to the coverage area of the wireless broadcast network.

In this example, video content from the multimedia content source 12 is being delivered to the wireless broadcast network 26. Such delivery is shown generally as a video session 172. The video content transmitted from the multimedia content source 12 to the wireless broadcast network 26 also is being received and stored by the control server 28. Such video content receipt and storage by the control server 28 is shown generally as a video session 176. The video content received and stored by the control server 28 also is being transmitted to the wireless access network 24, which is transmitting the video content to the mobile communication device 16, e.g., as discussed hereinabove with regard to the session mobility flow diagram shown in FIG. 3. The video content transmission from the control server 28 to the wireless access network 24 is shown generally as a video session 186. The video content transmission from the wireless access network 24 to the mobile communication device 16 is shown generally as a video session 188.

The delivery of video content to the mobile communication device 16 as part of the communication session is to be transferred back from the wireless access network 24 to the wireless broadcast network 26, e.g., when the mobile communication device 16 returns to the coverage area of the wireless broadcast network 26. The transfer is originated by the mobile communication device 16, e.g., when the mobile communication device 16 detects a wireless broadcast network 26 (shown generally as 178), such as when the mobile communication device 16 returns to the broadcast coverage area of the wireless broadcast network 26.

The mobile communication device 16 informs the control server 28 by requesting a transfer from the wireless access network 24 to the wireless broadcast network 26. Such request, which typically includes transmitting appropriate communication session control information to the control server 28, is shown generally as a request 182. The control server 28 sends the mobile communication device 16 an acknowledgement 184, which can include a session identification (session ID). In response to the request 182, the control server 28 can stop buffering video content received from the multimedia content source 12 and stops streaming video content to the mobile communication device 16 via the wireless access network 24.

The mobile communication device 16 then changes the video source for its video player from the wireless access (cellular data) network 24 to the wireless broadcast (DVB-H) network 26. In doing this, the mobile communication device 16 can begin (or resume) receiving the video stream via the wireless broadcast network 26. The video source change is shown generally as a source change 192. The delivery of video content received by the wireless broadcast network 26 and broadcast to the mobile communication device 16 is shown generally as a video session 174. The mobile communication device 16 then sends the control server 28 an acknowledgement 194 of the session transfer of the delivery of content from the wireless access network 24 to the wireless broadcast network 26.

The end user also can pause content received via the wireless broadcast (DVB-H) network 26. At the point of pausing the content delivery, the control server 28 directs the delivery of content to the mobile communication device 16 to be transferred from the wireless broadcast network 26 to the wireless access network 24. The delivery of content to the mobile communication device 16 via the wireless access network 24 continues until the end user goes back to receiving live content, either on the same broadcast (DVB-H) channel or on another broadcast (DVB-H) channel. At this point, the control server 28 directs the delivery of content to the mobile communication device 16 to be transferred back to the wireless broadcast network 26.

Figure 5:
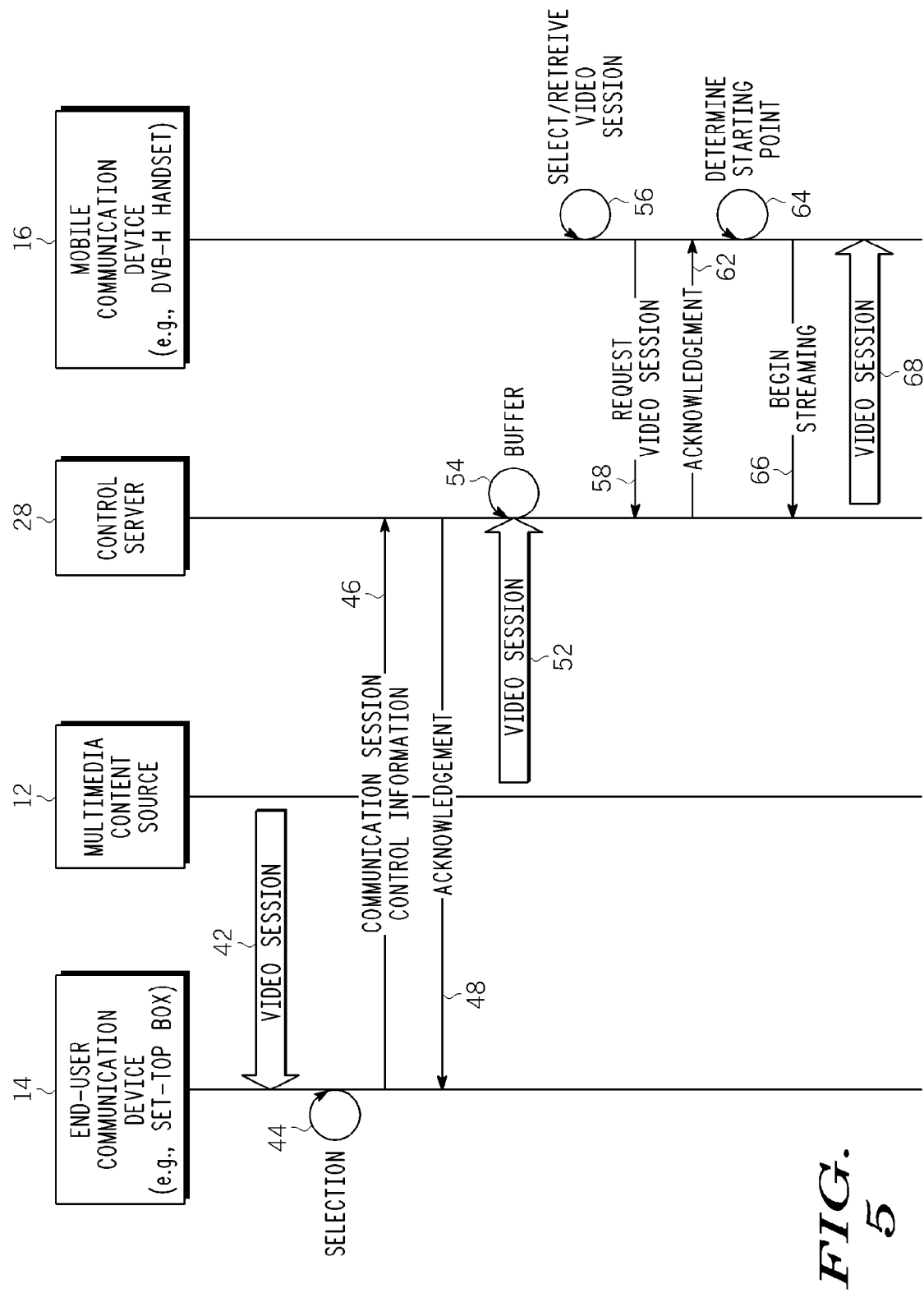
FIG. 5 is a flow diagram of a communication session transfer from an end user communication device, such as a set-top box or other multimedia content processing device, to a mobile end user communication device, such as a DVB-H mobile video device.

Referring now to FIG. 5, shown is a flow diagram of a communication session transfer from the end user communication device 14, such as a set-top box or other multimedia content processing device, to the mobile communication device 16, such as a DVB-H mobile video device (or handset) or other mobile communication device. For example, an end user watching a particular channel of broadcast video content on the end user's set-top box (end user communication device 14) would like to be able to watch the same video content on the end user's DVB-H handset (mobile communication device 16). In this example, the video content currently being viewed is the current channel on the set-top box. The communication (video) session is to be transferred from the set-top box to the mobile communication device 16. The transfer is initiated by the end user from the set-top box, although such is not necessary, as the transfer can be initiated by some other appropriate device or means. The end user can initiate the transfer from the set-top box in any suitable manner, e.g., using a remote control unit for the set-top box, which typically is an infrared or radio frequency (RF) control unit having a suitable user interface. As will be discussed in greater detail hereinbelow, upon transfer, the video session can be viewed on the mobile communication device 16 at the point at which the video session was transferred from the set-top box, the current point or anywhere in between. The control server 28 will facilitate the transfer, including the appropriate broadcast channel being viewed, the selected viewing position within the video content, and the appropriate wireless network to deliver the video content.

In this example, it is assumed that the end user communication device 14 (set-top box) is connected to the network 18 (e.g., an IP network) via the wireline access network 22 (e.g., a broadband wireline access network), and that the end user communication device 14 is viewing video content transmitted from the multimedia content source 12. Also, the mobile communication device 16 is connected to the network 18 via the wireless access network 24. As will be shown in the flow diagram, the video session will be delivered to the mobile communication device 16 via the control server 28. It is assumed that the mobile communication device 16 has registered itself to the system 10 and is a known member of a transferable device group. It should be understood that the multimedia content source 12, i.e., the multimedia content service provider for the end user communication device 14, may or may not also be the service provider for the mobile communication device 16. If the services providers are different, it is assumed that a service agreement or other appropriate agreement has been reached between the service providers.

The flow diagram generally shows the various flow of multimedia content, e.g., video content as part of a video session, and communication session control information between the end user communication device 14, the multimedia content source 12, the control server 28 and the mobile communication device 16. Initially, it is assumed that there is a video session, i.e., the multimedia content source 12 is transmitting video content to the end user communication device 14, shown generally as a video session 42. It should also be understood that, typically, the multimedia content source 12 also is transmitting video content to the control server 28, regardless of whether the control server 28 currently is displaying, storing or otherwise making use of the video content received from the multimedia content source 12. Therefore, as will be apparent from further discussion hereinbelow, the transfer of a communication session does not require signaling to the multimedia content source 12. In general, the delivery of the video content from the multimedia content source 12 to the control server 28 typically is via IP protocols.

The end user is viewing the video content (video session) on the end user communication device 14 (set-top box). In this example, the end user is leaving the vicinity of the end user communication device 14 and would like to transfer the video session to the end user's mobile communication device 16. Moreover, the end user also would like to begin viewing the video session on the mobile communication device 16 at the point in the video session that was being shown by the end user communication device 14 at the time the end user left the vicinity of the end user communication device 14. That is, the end user would like to resume viewing the video session at the point or location in the video session from which the end user will leave off with prior to the moment of video session transfer.

The end user selects the appropriate mobile communication device to which to transfer the video session, e.g., the mobile communication device 16, and initiates a transfer function. The selection and transfer initiation can be made in any suitable manner using any suitable device or devices, e.g., using the remote control unit of the end user communication device 14. The selection and transfer initiation are shown generally as a selection 44 in the flow diagram.

In response to the transfer initiation, the end user communication device 14 communicates to the control server 28 to identify the video session, the current timecode (i.e., viewing point or location in the video session), and the mobile communication device 16 that will be retrieving the video session. Such information, which can be in the form of metadata, is considered to be at least part of the communication session control information that is communicated to the control server 28. This particular communication from the end user communication device 14 to the control server 28 is shown generally as a communication 46. In response, the control server 28 can communicate an acknowledgement 48 to the end user communication device 14.

The control server 28 can begin buffering the video session for the mobile communication device 16. As discussed hereinabove, typically, the control server 28 has been receiving the video session from the multimedia content source 12 all along, i.e., since the video session was created or established. Such video session is shown generally as a video session 52 from the multimedia content source 12 to the control server 28. The control server 28 buffering the video session is shown generally as 54. It should be understood that the control server 28 can begin buffering the video session at any suitable time, not necessarily in response to session transfer instructions.

Once the mobile communication device 16 is registered with the control server 28, assuming the mobile communication device 16 has not already been registered with the control server 28, the mobile communication device 16 is ready for the end user to initiate the retrieval of the video session. At this point, the end user can select an option 56 of retrieving the video session. The end user, e.g., via the mobile communication device 16, will then request the video session from the control server 28. Such request is shown generally as a request 58. In response, the control server 28 can communicate an acknowledgement 62 to the mobile communication device 16. The acknowledgement 62 can include information (e.g., metadata) regarding the identification of the selected video session, confirmation of the registration of the mobile communication device 16 and other appropriate communication session control information.

The end user typically will have the option of starting, i.e., resuming, the transferred video session at any appropriate point or location in the video session, e.g., the point at which the video session was transferred from the end user communication device 14, the current point in the video session or anywhere in between. The end user determines the desired starting point of the transferred video session (shown generally as 64). Once the end user has selected the desired starting point in the transferred video session, the mobile communication device 16 will communicate a request 66 to the control server 28 to begin streaming the video session to the mobile communication device 16. The request 66 typically will include the end user's desired starting point for the transferred video session.

In response to the request 66, the control server 28 will begin streaming the video session to the mobile communication device 16. The video session is shown generally as a transferred video session 68. In this manner, the video session, which was being viewed by the end user only on the end user communication device 14, now can be viewed by the end user on the mobile communication device 16.

The end user views the same video session, which was displayed on the end user communication device 14, on the mobile communication device 16 without interruption. It should be understood that there can be a finite time between the end of viewing on the end user communication device 14 and the start of viewing on the mobile communication device 16. If the mobile communication device 16 decides to "pick-up" or resume viewing the channel at its current broadcast point or location, the control server 28 can determine and instruct the mobile communication device 16 to use the broadcast channel, such as a DVB-H broadcast channel, such as the wireless broadcast network 26, instead of via an IP unicast protocol, such as the wireless access network 24. That is, if the mobile communication device 16 selects the current time at the starting point of the video session, the control server 28 can instruct the mobile communication device 16 to select the appropriate broadcast channel. If the mobile communication device 16 selects a time other than the current time, the control server 28 can decide to use the cellular data network to deliver the video session 68 to the mobile communication device 16 using an IP unicast protocol. Therefore, the control server 28 will deliver the video session 68 to the mobile communication device 16 via the wireless access network (control point) 24.

Because, the cellular data network is a unicast network, the cellular data network typically uses more bandwidth, and therefore is used mainly for transmission of control information. However, as just discussed, if an end user wishes to view content from a transferred video session at a time or starting point other than what currently is being broadcast from the broadcast channel of interest, the control server 28 will instruct the mobile communication device 16 to receive stored or buffered content using an IP unicast protocol via the cellular data network, i.e., via the wireless access network 24. Also, the control server 28 may instruct the mobile communication device 16 to use the cellular data network and the wireless access network 24 in other situations or under other conditions.

Figure 6:
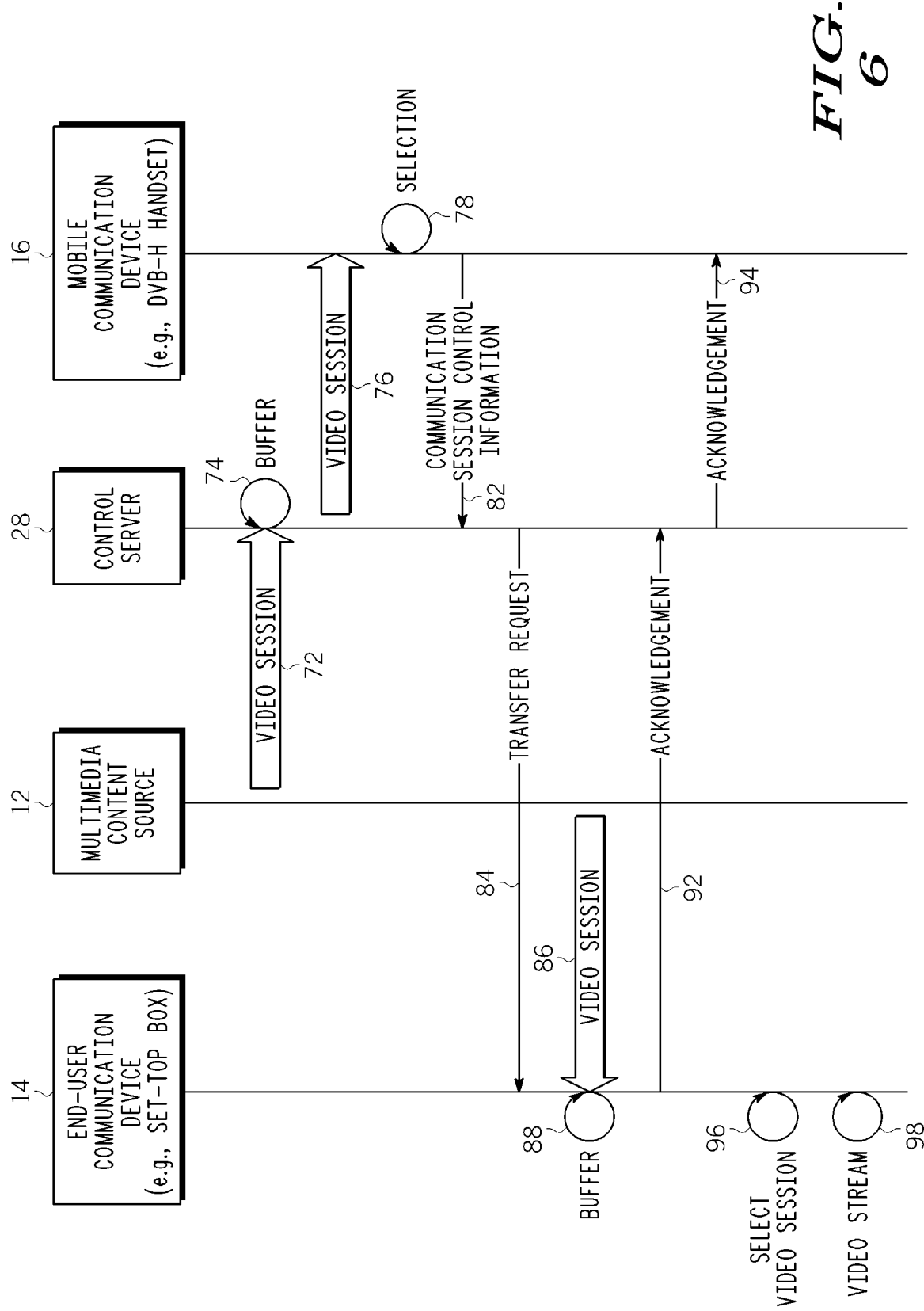
FIG. 6 is a flow diagram of a communication session transfer from a mobile end user communication device, such as a DVB-H mobile communication device, to an end user communication device, such as a set-top box or other multimedia content processing device.

Referring now to FIG. 6, shown is a flow diagram of a communication session transfer from the mobile communication device 16 to the end user communication device 14. For example, an end user viewing a video session on the end user's mobile communication device 16 arrives at the home or other vicinity of the end user communication device 14 and would like to transfer the video session to the end user communication device 14. Therefore, in this example, the video session will be transferred from the mobile communication device 16 to the end user communication device 14. The transfer is initiated by the end user using the mobile communication device 16, although such is not necessary. For example, the end user can initiate the transfer by some other appropriate device or means, i.e., the end user can initiate the transfer using the end user communication device 14. The control server 28 will facilitate the transfer, including the appropriate broadcast channel being viewed and the proper point or location in the video session for uninterrupted viewing, and the appropriate wireless network to deliver the video content.

It is assumed that the end user communication device 14 is connected to the network 18 via the wireline access network 22, and that the end user communication device 14 is receiving video content transmitted from the multimedia content source 12, regardless of whether the end user communication device 14 is displaying any received video content. Also, the mobile communication device 16 is connected to the network 18 via an appropriate wireless network, e.g., the wireless broadcast network 26 and/or the wireless access network 24, and the video session being viewed on the mobile communication device 16 is being received via the wireless network's control point. As will be shown in the flow diagram, the video session will be transferred to the end user communication device 14. Also, as with the example shown in FIG. 5 and discussed hereinabove, in this example, it is assumed that the mobile communication device 16 has registered itself to the system 10 and is a known member of a transferable device group. Also, if the multimedia content service provider for the end user communication device 14 is not the same service provider for the mobile communication device 16, it is assumed that an appropriate agreement has been reached between the service providers.

In FIG. 6, the flow diagram generally shows the various flow of multimedia content, e.g., video content as part of a video session, and communication session control information between the end user communication device 14, the multimedia content source 12, the control server 28 and the mobile communication device 16. Initially, it is assumed that the end user is viewing a video session on the end user's mobile communication device 16. That is, the multimedia content source 12 is transmitting video content to the control server 28, which is buffering all or a portion of the received video content, and transmitting the video content to the mobile communication device 16. The transmission of the video session from the multimedia content source 12 to the control server 28 is shown generally as a video session 72 in the flow diagram. The control server 28 buffering the video content is shown generally as a buffering 74 in the flow diagram. The transmission of the video session from the control server 28 to the mobile communication device 16, e.g., via the wireless broadcast network 26, is shown generally as a video session 76 in the flow diagram. It should also be understood that, typically, the multimedia content source 12 also is transmitting video content to the end user communication device 14, regardless of whether the end user communication device 14 currently is displaying, storing, processing or otherwise making use of the video content received from the multimedia content source 12.

The end user selects the appropriate end user communication device to which to transfer the video session, e.g., the end user communication device 14, and initiates a transfer function. The selection and transfer initiation can be made in any suitable manner using any suitable device or devices, e.g., using an appropriate end user interface on the mobile communication device 16. The selection and transfer initiation are shown generally as a selection 78 in the flow diagram.

In response to the transfer initiation, the mobile communication device 16 communicates to the control server 28 to identify the video session, the current timecode (i.e., viewing point or location in the video session), and the end user communication device 14 that will be retrieving the video session. Such information is considered to be at least part of communication session control information that is communicated to the control server 28. This particular communication from the mobile communication device 16 to the control server 28 is shown generally as a communication 82 in the flow diagram.

Based on the receipt of this communication session control information, the control server 28 can request the transfer of the video session to the end user communication device 14. The transfer request is shown generally in the flow diagram as a transfer request communication 84 from the control server 28 to the end user communication device 14.

The end user communication device 14 can begin buffering the video session, assuming the end user communication device 14 is not already buffering the video session. As discussed hereinabove, the end user communication device 14 has been receiving the video session from the multimedia content source 12 all along, i.e., since the video session was created or established. Such video session is shown generally as a video session 86 from the multimedia content source 12 to the end user communication device 14. The end user communication device 14 buffering the video session is shown generally as a buffering 88 in the flow diagram.

In response to the transfer request 84 from the control server 28, the end user communication device 14 can communicate to the control server 28 an acknowledgement 92 of the video session transfer request. The control server 28 then will communicate to the mobile communication device 16 an acknowledgement 94 of the video session transfer. Each of the acknowledgement 92 and the acknowledgement 94 can include information (e.g., metadata) regarding the identification of the selected video session, the current viewing point or location in the video session, and other appropriate communication session control information.

At this point, the end user communication device 14 is ready for the end user to initiate the retrieval of the video session. The end user typically will have the option of starting (i.e., resuming) the transferred video session at any appropriate point or location in the video session, e.g., the point at which the video session was transferred from the mobile communication device 16, the current point in the video session or anywhere in between. The end user determines the desired starting point of the transferred video session, shown generally as a selection 96 in the flow diagram. Once the end user has selected the desired starting point in the transferred video session, the end user communication device 14 will begin the transfer of the video session to its associated display device (not shown), such as a television, computer monitor or other appropriate display device coupled to or incorporated in the end user communication device 14. The transfer is shown generally as a video stream 98 in the flow diagram.

Thus, in this example, the video session, which was being viewed on the mobile communication device 16, now can be viewed on the end user communication device 14. The end user views the same video session that was displayed on the mobile communication device 16 on the end user communication device 14 without interruption. It should be understood that there can be a finite time between the end of viewing on the mobile communication device 16 and the start of viewing on the end user communication device 14.

Figure 7:
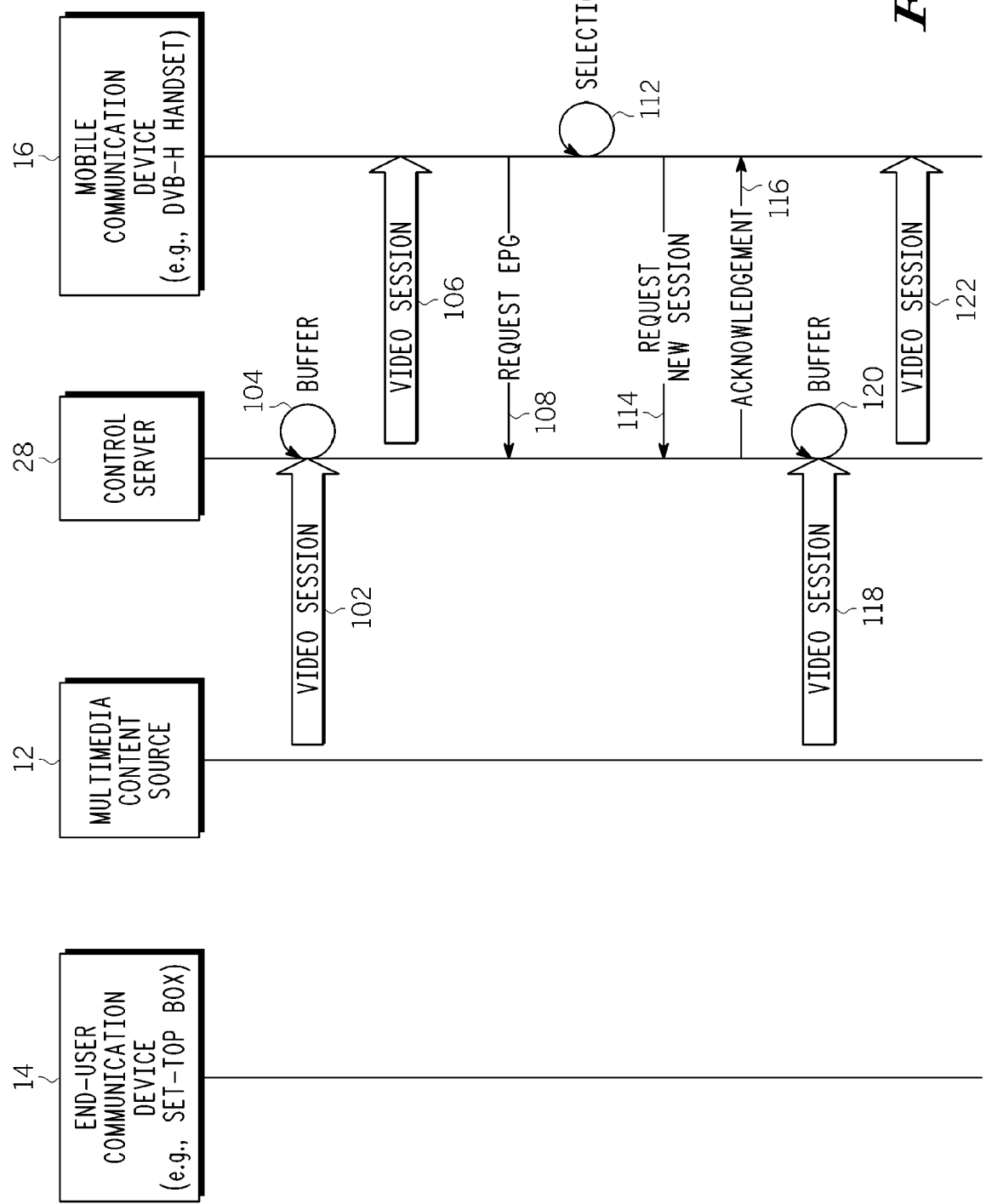
FIG. 7 is a flow diagram of a communication session change, i.e., a channel change, for a mobile end user communication device, such as a DVB-H mobile communication device.

Referring now to FIG. 7, shown is a flow diagram of a communication session change, i.e., a channel change, for a mobile end user communication device, such as the mobile communication device 16. The flow diagram illustrates how a particular video session channel is selected on the mobile communication device 16.

Initially, it is assumed that the end user is viewing a video session on the end user's mobile communication device 16. That is, the multimedia content source 12 is transmitting video content to the control server 28, which is buffering all or a portion of the received video content, and transmitting the buffered video content to the mobile communication device 16. The transmission of the video session from the multimedia content source 12 to control server 28 is shown generally as a video session 102 in the flow diagram. The control server 28 buffering the video content is shown generally as a buffering 104 in the flow diagram. The transmission of the video session from the control server 28 to the mobile communication device 16 is shown generally as a video session 106 in the flow diagram.

In this example, the end user wants to change to a new video session on the mobile communication device 16, i.e., the end user wants to change the viewing channel of the video content being viewed on the mobile communication device 16. Using the mobile communication device 16, the end user requests or obtains an electronic program guide (EPG) from the control server 28. Such request is shown generally as a request 108 in the flow diagram. The electronic program guide can be transmitted along with or separately from the video content transmitted from the multimedia content source 12. Also, the electronic program guide can be stored in the control server 28, e.g., as part of the buffering 104 performed by the control server 28.

Once the mobile communication device 16 obtains the electronic program guide, the end user, via the mobile communication device 16, selects the new video session (channel) from the electronic program guide, that the end user would like to view. This selection is shown generally as a selection 112 in the flow diagram.

In response to the end user's selection 112, the mobile communication device 16 communicates to the control server 28 a new video session request 114 that identifies the new video session. In response to the request 114, the control server 28 can send an acknowledgement 116 to the mobile communication device 16. The control server 28 also begins receiving and buffering a new video session from the multimedia content source 12. The new video session is shown as a video session 118. The control server 28 buffering the video content is shown generally as a buffering 120 in the flow diagram.

The mobile communication device 16 then begins receiving the new video session, e.g., via the control server 28. The new video session is shown generally as a video session 122. The end user then can view the new video session 122 on the mobile communication device 16.

Figure 8:
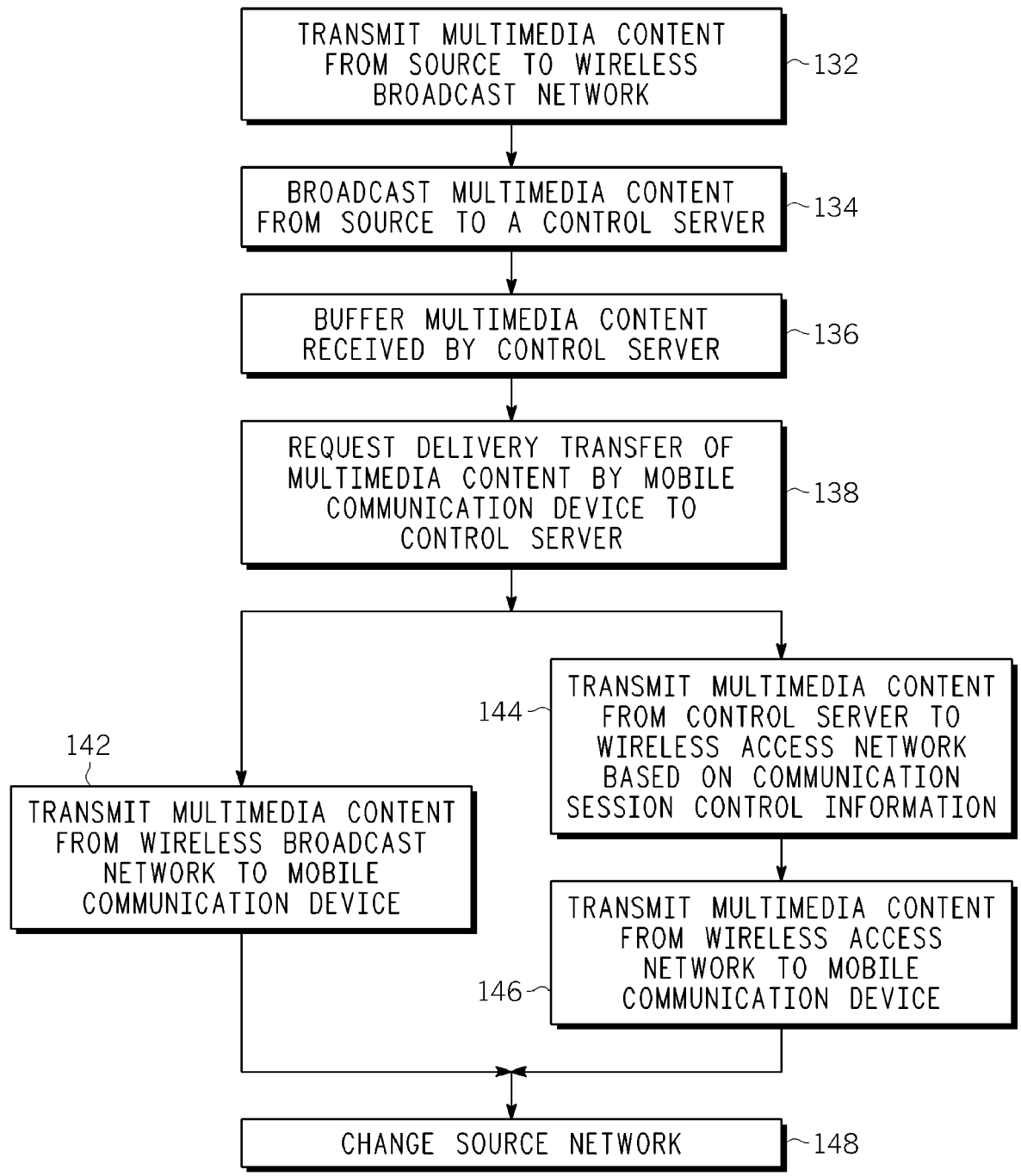
FIG. 8 is a block diagram of a method for providing session mobility of multimedia content delivered to a mobile communication device, such as a DVB-H mobile communication device.

Referring now to FIG. 8, shown is a block diagram of a method 130 for providing session mobility of multimedia content delivered to a mobile communication device, such as a DVB-H mobile video device. The method 130 includes a step 132 of transmitting multimedia content from the multimedia content source 12 to the wireless broadcast network 26. As discussed hereinabove, the multimedia content source 12 can transmit multimedia content, such as video content, to the wireless broadcast network 26 in any suitable manner, e.g., via the network 18. The method 130 also includes a step 134 of transmitting multimedia content from the multimedia content source 12 to the control server 28. The multimedia content is transferred from the multimedia content source 12 to the control server 28 in any suitable manner, e.g., via the network 18.

The method 130 also includes a step 136 of the control server 28 buffering or storing at least a portion of the multimedia content received from the multimedia content source 12. As discussed hereinabove, the control server 28 includes one or more suitable storage elements, such as the storage element 34, suitable to buffer all or a portion of the multimedia content broadcast to the control server 28. The storage of the received multimedia content can be performed in anticipation of the transmission of multimedia content from the control server 28 to the mobile communication device 16, e.g., as part of a communication session transfer, or for other appropriate reason.

The method 130 also includes a step 138 of the mobile communication device 16 requesting a transfer of the delivery of the multimedia content thereto. For example, if the mobile communication device 16 is receiving multimedia content broadcast from the wireless broadcast network 26 and is leaving the coverage area of the wireless broadcast network 26, the mobile communication device 16 may transmit a transfer request to the control server 28 to transfer the delivery of content from the wireless broadcast network 26 to the wireless access network 24. Also, for example, if the mobile communication device 16 is receiving multimedia content broadcast from the wireless access network 26 and is entering the coverage area of the wireless broadcast network 26, the mobile communication device 16 may transmit a transfer request to the control server 28 to transfer the delivery of content from the wireless access network 24 to the wireless broadcast network 26.

As discussed hereinabove, the transfer request can include appropriate communication session control information to cause the control server 28 to effect the transfer of the content delivery to the mobile communication device 16 via the appropriate network 24, 26. The control server 28 can receive communication session control information from the mobile communication device 16 that identifies the mobile communication device 16 and the transfer of the delivery of content of a video session to the mobile communication device 16. The set of communication session control information can be in the form of metadata or in other suitable form.

The method 130 also includes a step 142 of transmitting multimedia content from the wireless broadcast network 26 to the mobile communication device 16. As discussed hereinabove, multimedia content transmitted from the multimedia content source 12 to the wireless broadcast network 26 can be broadcast from the wireless broadcast network 26 to the mobile communication device 16 using a suitable broadcast channel. Also, the transmission step 142 can be based on communication session control information received by the control server 28 from the mobile communication device 16.

For example, if the mobile communication device 16 is outside of the coverage area of the wireless broadcast network 26 and is receiving multimedia content via the wireless access network 24, upon returning to the coverage area of the wireless broadcast network 26, the mobile communication device 16 can transmit a transfer request to the control server 28 to transfer the delivery of content to the mobile communication device 16 from the wireless access network 24 to the wireless broadcast network 26. Based on such request, which includes suitable communication session control information, the control server 28 instructs the mobile communication device 16 to begin (or resume) receiving multimedia content from the wireless broadcast network 26 instead of from the wireless access network 24.

The method 130 also includes a step 144 of transmitting multimedia content from the control server 28 to the wireless access network 24, based on communication session control information received by the control server 28 from the mobile communication device 16. As discussed hereinabove, the control server 28 can receive communication session control information from the mobile communication device 16 regarding the transfer of the delivery of video content as part of a particular communication session. In response to the receipt of such communication session control information, the control server 28 can begin transmitting multimedia content buffered and/or stored thereby to the wireless access network 24.

The method 130 also includes a step 146 of transmitting multimedia content from the wireless access network 24 to the mobile communication device 16. As discussed hereinabove, the wireless access network 24 is any suitable cellular data unicast network that delivers multimedia content to the mobile communication device 16 using a suitable unicast protocol.

The method 130 also includes a step 148 of the mobile communication device 16 changing the source network from which the mobile communication device 16 is receiving multimedia content. As discussed hereinabove, in response to a transfer request from the mobile communication device 16, the control server 28 can transfer the delivery of multimedia content between the wireless broadcast network 26 and the wireless access network 24. In this manner, the mobile communication device 16 will begin receiving multimedia content via the wireless network to which the control server 28 has transferred content delivery. Accordingly, the video source for the video player in the mobile communication device 16 changes from the wireless network from which the control server 28 has transferred content delivery to the wireless network to which the control server 28 has transferred content delivery.

The session mobility systems and methods described hereinabove can be partially or completely packaged, stored, built or otherwise contained on or within one or more end user communication devices. Alternatively, the session mobility methods and systems described hereinabove can be partially or completely packaged, stored, built or otherwise contained on or within one or more network device or device components, or standalone devices or components, to which one or more of the end user communication devices is or can be coupled.

The method shown in FIG. 8 may be implemented in a general, multi-purpose or single purpose processor. Such a processor will execute instructions, either at the assembly, compiled or machine-level, to perform that process. Those instructions can be written by one of ordinary skill in the art following the description of FIG. 8 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the session mobility systems, methods and devices herein described without departing from the spirit and scope of the invention as defined by the appended claims and their full scope of equivalents.

The invention claimed is:

1. A method for providing mobility of multimedia content delivered to a mobile communication device, wherein the mobile communication device is configured to receive multimedia content via a wireless broadcast network and a wireless access network, comprising the steps of:
    broadcasting multimedia content from a multimedia content source to the wireless broadcast network, wherein the wireless broadcast network is configured to deliver at least a portion of the multimedia content received thereby to the mobile communication device;
    transmitting by the multimedia content source at least a portion of the multimedia content broadcast to the wireless broadcast network to a control server coupled to the wireless broadcast network and the wireless access network, the control server storing the at least the portion of the multimedia content transmitted to the control server; and
    transmitting the stored at least the portion of the multimedia content transmitted to the control server to the wireless access network and initiating broadcasting of multimedia content from the multimedia content source to the wireless access network responsive to a request from the mobile communication device, wherein the wireless access network is configured to deliver at least a portion of the multimedia content received thereby to the mobile communication device,
    wherein the control server is configured to transfer the delivery of multimedia content to the mobile communication device between the wireless broadcast network and the wireless access network in response to receiving a transfer request from the mobile communication device.

2. The method as recited in claim 1, wherein, in response to the mobile communication device leaving the coverage area of the wireless broadcast network, the mobile communication device initiates a transfer request to the control server that the delivery of multimedia content be received from the wireless access network.

3. The method as recited in claim 1, wherein, in response to the mobile communication device entering the coverage area of the wireless broadcast network, the mobile communication device initiates a transfer request to the control server that the delivery of multimedia content be received from the wireless broadcast network.

4. The method as recited in claim 1, wherein, in response to the mobile communication device losing transmission signal strength from the wireless broadcast network, the mobile communication device initiates a transfer request to the control server that the delivery of multimedia content be received from the wireless access network.

5. The method as recited in claim 1, wherein the control server transfers the delivery of multimedia content to the mobile communication device in response to receiving a transfer request that includes communication session control information identifying the mobile communication device.

6. The method as recited in claim 1, wherein the control server is configured to transmit an acknowledgement to the mobile communication device in response to receiving a transfer request from the mobile communication device, wherein the acknowledgement includes an identification of a communication session to which the multimedia content transmitted to the mobile communication device belongs.

7. The method as recited in claim 1, wherein multimedia content is being delivered to the mobile communication device via the wireless access network and the mobile communication device is viewing a first channel of multimedia content, and wherein, in response to the mobile communication device initiating a request to change the channel of multimedia content being viewed by the mobile communication device from the first channel to a second channel of multimedia content, the control server transfers the delivery of multimedia content to the mobile communication device from the wireless access network to the wireless broadcast network.

8. The method as recited in claim 1, wherein the control server device and the end user communication device is selected from the group consisting of a network session controller, a signal converter box, a signal decoder box, a digital video recorder, a digital video disk recorder, a personal video recorder device, a home media server, a digital video server, a residential gateway, a video receiver, a computer.

9. The method as recited in claim 1, wherein the mobile end user communication device is selected from the group consisting of a Digital Video Broadcasting-Handheld (DVB-H) mobile video device, a cellular telephone, a smart telephone, a personal digital assistant (PDA), a digital music player, a portable video player, a wireless handheld device, a digital camera, a mobile communication device, a laptop personal computer (PC), a notebook PC and a mobile computing device.

10. A control server device for providing mobility of multimedia content delivered to a mobile communication device, wherein the mobile communication device is configured to receive multimedia content via a wireless broadcast network and a wireless access network, comprising:
    a controller configured to receive multimedia content from a multimedia content source and communication session control information from the mobile communication device; and
    a memory element coupled to the controller for storing at least a portion of the multimedia content and the communication session control information received by the controller,
    wherein, in response to receiving a transfer request from the mobile communication device, the controller is configured to transfer the delivery of multimedia content to the mobile communication device between from the wireless broadcast network and from the wireless access network and to transmit the stored at least the portion of the multimedia content to the mobile communication device using the wireless access network and to initiate broadcasting of multimedia content from the multimedia content source to the wireless access network responsive to the transfer request requesting transfer of delivery of multimedia content from the wireless broadcast network to the wireless access network.

11. The device as recited in claim 10, wherein the controller is configured to transmit at least a portion of the multimedia content received thereby to the wireless access network in response to receiving a transfer request from the mobile communication device that the delivery of multimedia content be received from the wireless access network.

12. The device as recited in claim 11, wherein the mobile communication device initiates a transfer request to the control server that the delivery of multimedia content be received from the wireless access network in response to the mobile communication device leaving the coverage area of the wireless broadcast network.

13. The device as recited in claim 11, wherein the mobile communication device initiates a transfer request to the control server that the delivery of multimedia content be received from the wireless access network in response to the mobile communication device losing transmission signal strength from the wireless broadcast network.

14. The device as recited in claim 10, wherein the controller is configured to discontinue the transmission of multimedia content received thereby to the wireless access network in response to receiving a transfer request from the mobile communication device that the delivery of multimedia content be received from the wireless broadcast network.

15. The device as recited in claim 14, wherein the mobile communication device initiates a transfer request to the control server that the delivery of multimedia content be received from the wireless broadcast network in response to the mobile communication device entering the coverage area of the wireless broadcast network.

16. The device as recited in claim 14, wherein multimedia content is being delivered to the mobile communication device via the wireless access network and the mobile communication device is viewing a first channel of multimedia content, and wherein, in response to the mobile communication device initiating a request to change the channel of multimedia content being viewed by the mobile communication device from the first channel to a second channel of multimedia content, the controller transfers the delivery of multimedia content to the mobile communication device from the wireless access network to the wireless broadcast network.

17. The device as recited in claim 10, wherein the control server device is selected from the group consisting of a network session controller, a signal converter box, a signal decoder box, a digital video recorder, a digital video disk recorder, a personal video recorder device, a home media server, a digital video server, a residential gateway, a video receiver, a computer.

18. The device as recited in claim 11, wherein the mobile end user communication device is selected from the group consisting of a Digital Video Broadcasting-Handheld (DVB-H) mobile video device, a cellular telephone, a smart telephone, a personal digital assistant (PDA), a digital music player, a portable video player, a wireless handheld device, a digital camera, a mobile communication device, a laptop personal computer (PC), a notebook PC and a mobile computing device.

19. A computer readable medium storing instructions that, when executed on a programmed processor, carry out a method for providing mobility of multimedia content delivered to a mobile communication device, wherein the mobile communication device is configured to receive multimedia content via a wireless broadcast network and a wireless access network, comprising:

instructions for broadcasting multimedia content from a multimedia content source to the wireless broadcast network, wherein the wireless broadcast network is configured to deliver at least a portion of the multimedia content received thereby to the mobile communication device;

instructions for transmitting by the multimedia content source at least a portion of the multimedia content broadcast to a control server coupled to the wireless broadcast network and the wireless access network, the control server storing the at least the portion of the multimedia content transmitted to the control server; and instructions for transmitting the stored at least the portion of the multimedia content transmitted to the control server to the wireless access network and initiating broadcasting of multimedia content from the multimedia content source to the wireless access network responsive to a request from the mobile communication device, wherein the wireless access network is configured to deliver at least a portion of the multimedia content received thereby to the mobile communication device, wherein the control server is configured to transfer the delivery of multimedia content to the mobile communication device between the wireless broadcast network and the wireless access network in response to receiving a transfer request from the mobile communication device.

* * * * *